US010539038B2

(12) United States Patent
Reavis et al.

(10) Patent No.: US 10,539,038 B2
(45) Date of Patent: Jan. 21, 2020

(54) AERODYNAMIC TORQUE REDUCING VALVE FOR USE IN A BLEED AIR SYSTEM

(71) Applicant: HONEYWELL INTERNATIONAL INC., Morris Plains, NJ (US)

(72) Inventors: Adriel Reavis, Chandler, AZ (US); Aaron M. Bensel, Tempe, AZ (US); Ara Briley, Chandler, AZ (US); Jeffrey Smith, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 385 days.

(21) Appl. No.: 15/398,047

(22) Filed: Jan. 4, 2017

(65) Prior Publication Data

US 2018/0187606 A1 Jul. 5, 2018

(51) Int. Cl.
*F02C 9/18* (2006.01)
*F01D 17/14* (2006.01)
*F04D 27/02* (2006.01)
*F16K 1/22* (2006.01)

(52) U.S. Cl.
CPC .............. *F01D 17/148* (2013.01); *F02C 9/18* (2013.01); *F04D 27/0215* (2013.01); *F16K 1/222* (2013.01)

(58) Field of Classification Search
CPC ....... F02C 9/18; F04D 27/0215; F01D 17/148
USPC .......................... 251/305–308; 137/242, 243
See application file for complete search history.

(56) References Cited

U.S. PATENT DOCUMENTS 2,095,263 A * 10/1937 Moss ................... F02D 9/1015
251/283
2,271,390 A * 1/1942 Dodson ................... F02M 19/00
251/283
2,662,545 A * 12/1953 Kelley ...................... F16K 1/22
137/242
3,442,489 A * 5/1969 Cary ...................... F16K 1/222
251/305
3,480,254 A * 11/1969 Fawkes ..................... F16K 1/22
251/305
3,568,975 A * 3/1971 Obermaier ................ F16K 1/22
251/306

(Continued)

FOREIGN PATENT DOCUMENTS

GB           2535751 A      8/2016
JP          57157866 A      9/1982
(Continued)

OTHER PUBLICATIONS

Extended EP Search Report for Application No. 18150099.2 dated Jun. 5, 2018.

*Primary Examiner* — Christopher S Bobish

(74) *Attorney, Agent, or Firm* — Lorenz & Kopf, LLP

(57) ABSTRACT

A fan air valve for use in high pressure airflow applications is provided. The described fan air valve embodiments employ a plate with a standoff of a height based on aerodynamic torque. The height of the standoff informs a size of an angle at which the plate is positioned within a respective flow body. The described embodiments result in a fan air valve having a closed flow area that is not much larger than the closed flow area of a valve having a perpendicular plate. The described embodiments avert compression of perimeter ice on a downstream edge of the plate during modulation without requiring software adjustments to address perimeter ice.

20 Claims, 6 Drawing Sheets

(56) References Cited

U.S. PATENT DOCUMENTS

| | | | | |
|---|---|---|---|---|
| 3,627,261 | A * | 12/1971 | Ludeman | F16K 1/22 251/305 |
| 3,960,177 | A | 6/1976 | Baumann | |
| 4,047,696 | A * | 9/1977 | Ludwig | F16K 1/22 251/308 |
| 4,489,917 | A * | 12/1984 | Baumann | F16K 1/222 251/305 |
| 5,102,097 | A * | 4/1992 | Davis | B64D 13/02 251/283 |
| 5,465,756 | A * | 11/1995 | Royalty | F16K 1/222 137/625.31 |
| 5,794,591 | A * | 8/1998 | Kalebjian | B29C 45/006 123/337 |
| 6,170,461 | B1 * | 1/2001 | Pursifull | F02D 9/1015 123/337 |
| 6,722,137 | B2 * | 4/2004 | Proctor | F01D 17/148 123/337 |
| 6,726,176 | B2 * | 4/2004 | Bauman | F16K 1/222 251/305 |
| 6,793,197 | B2 * | 9/2004 | DePenning | F16K 1/222 123/337 |
| 7,077,383 | B1 * | 7/2006 | Dreisilker | B64D 13/02 251/305 |
| 7,240,691 | B2 * | 7/2007 | Bevan | F01D 17/105 137/554 |
| 7,490,627 | B2 * | 2/2009 | Hourai | F16K 1/222 137/625.31 |
| 8,540,210 | B2 * | 9/2013 | Baumann | F16K 27/0272 251/121 |
| 9,897,214 | B2 * | 2/2018 | Bensel | F16K 1/12 |
| 2003/0034474 | A1 | 2/2003 | Proctor et al. | |
| 2011/0024660 | A1 * | 2/2011 | Baumann | F16K 1/222 251/306 |

FOREIGN PATENT DOCUMENTS

| | | |
|---|---|---|
| JP | 11-063246 A | 3/1999 |
| JP | 1182758 A | 3/1999 |
| JP | 2008249151 A | 10/2008 |
| WO | 92/03674 A1 | 3/1992 |
| WO | 2016182909 A1 | 11/2016 |

* cited by examiner

AERODYNAMIC TORQUE REDUCING VALVE FOR USE IN A BLEED AIR SYSTEM

TECHNICAL FIELD

The present disclosure generally relates to bleed air systems, and more particularly relates to valves for use in turbofan engine bleed air systems.

BACKGROUND

In many aircraft, air is extracted from the main engines to supply conditioned air for various aircraft pneumatic systems throughout the aircraft. Aircraft employing this technique include aircraft that are powered by turbo-jet, turbo-fan, and turbo-prop engines, such as, commercial air transport aircraft, business jets, and military aircraft. The air extracted from the main engines is referred to as "bleed air," and is supplied to and controlled by a bleed air system (BAS). The BAS generally comprises a series of valves, ducting, and a pre-cooler, and the bleed air is sourced from a fan and/or different ports of the compressor section of a turbine engine. Air in the BAS is generally supplied at high pressure and high temperature, and is then regulated and cooled before it is delivered downstream to the aircraft pneumatic systems.

The valves in the BAS need to open, close, regulate and modulate against varying inlet (upstream) air pressures, in order to maintain the desired output (downstream) pressures. Most valves in the BAS are controlled by actuators, many of which are also pneumatically controlled. In operation, bleed air may be routed to a pneumatic actuator in which a piston or a diaphragm is pressurized to move a valve in a flow path of a flow body such as a duct. The valve may take a variety of forms suitable for performing the described functions.

Fan air valves are valves in the BAS that face several specific issues. First, the high airflow subjects the fan air valve in the BAS to a tremendous amount of torque. In particular, the torque on the fan air valve may make the fan air valve difficult to control. In order to reduce the torque on the fan air valve, the upstream surface of the fan air valve may be modified with one or more strategically placed standoffs. The standoffs are placed at predetermined locations around the upstream surface to create a torque reducing fan air valve. Secondly, the fan air is often cold enough to cause an ice buildup on an upstream surface of the torque reducing fan air valve. However, when the torque reducing fan air valve is modulated open, one or more of the standoffs may interact with the ice buildup. The continued modulation of the torque reducing fan air valve may cause the standoff to compress the ice buildup near the perimeter of the fan air valve. It has been postulated that this ice buildup could cause the valve to stick, and thereby reduce the reliability of the torque reducing fan air valve. Attempts to address this postulated issue generally include not completely closing the torque reducing fan air valve, which results in not completely closing off the airflow in the respective duct when full closure is desired, and employing additional software and components to prevent ice buildup.

Hence, design improvements to torque reducing fan air valves that minimize or eliminate compression of the ice buildup are desirable. An improved torque reducing fan air valve (hereinafter referred to as a fan air valve, or valve, for simplicity) would also be one that could completely close off the airflow in the respective duct when full closure is desired. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A fan air valve for use in a flow path of a duct is provided. The fan air valve comprises: a plate configured to be pivotally mounted within an inner surface of the flow path, the plate rotatable about a pivot axis that is perpendicular to a flow path centerline, and configured for pivoting between a closed position, in which the plate substantially inhibits airflow through the flow path, and an open position, in which the plate creates an aperture in the flow path; and a standoff located on an upstream surface of the plate; and wherein the upstream surface of the plate is offset from being perpendicular to the flow path centerline by an angle, the angle being based on a height of the standoff.

A fan air duct assembly is also provided. The fan air duct assembly comprises: a duct comprising a flow path with a centerline, the duct configured to mount within an aircraft bleed air system; a plate pivotally mounted within an inner surface of the flow path, the plate: rotatable about a pivot axis perpendicular to the centerline of the flow path; comprising an upstream surface that is offset from being perpendicular to the flow path centerline by an angle; configured for pivoting between a closed position, in which the plate substantially inhibits airflow through the flow path, and an open position, permitting airflow in the flow path; and a standoff located on the upstream surface of the plate, the standoff having a height, and wherein the angle is based on the height of the standoff.

Also provided is a turbofan engine, comprising: a flow body comprising a flow path with a centerline therethrough; a plate pivotally mounted within the flow path, the plate: rotatable about a pivot axis perpendicular to the centerline of the flow path; comprising an upstream surface that is offset from being perpendicular to the centerline of the flow path by an angle; configured for pivoting between a closed position, in which the plate substantially inhibits airflow through the flow path, and an open position, permitting airflow in the flow path; and a standoff located on the upstream surface of the plate, the standoff having a height, and wherein the angle is based on the height of the standoff.

Furthermore, other desirable features and characteristics of the bleed air system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
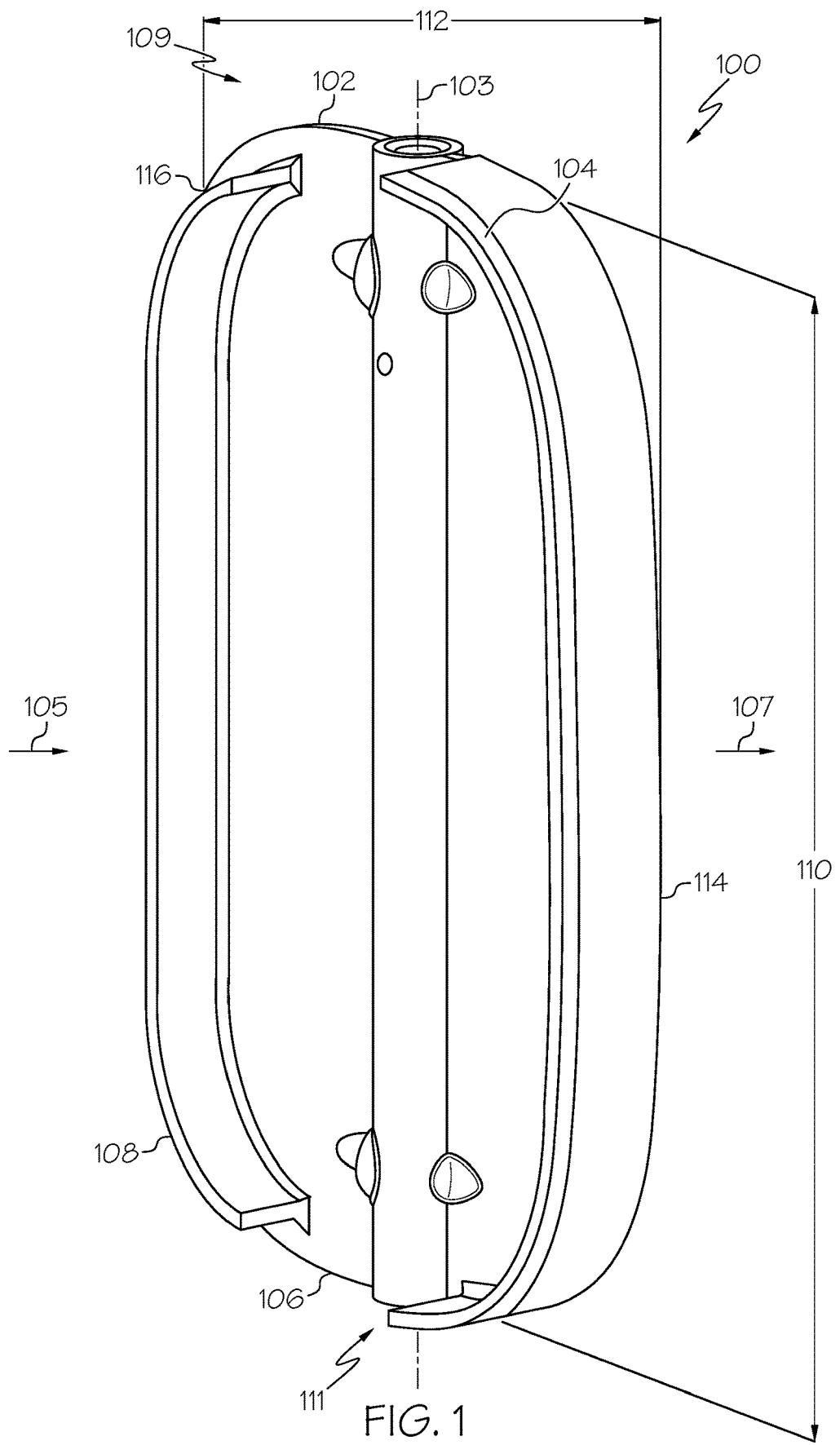
FIG. 1 is a perspective view of a fan air valve for use in a high airflow application, in accordance with various embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the embodiments and not to limit the contemplated scope of the disclosure which is defined by the claims. Furthermore, there is no intention to be bound by any expressed or implied theory presented in the preceding technical field, background, brief summary, or the following detailed description.

A review of the use and function of a fan air valve may be useful. Within a turbofan gas turbine engine, an intake fan generally draws air into the gas turbine engine and accelerates it. A fraction of the accelerated air exhausted from the intake fan is directed through a bypass flow passage and into a fan air duct. The remaining fraction of air exhausted from the intake fan is generally directed into a compressor. The compressor, which may have one or more compressor ports, compresses the air received via the intake fan and raises the pressure. Some of the compressed high pressure air is then directed into a combustor. In addition to the fan air directed to the fan air duct, some of the compressed high pressure air may also be removed from the compressor as bleed air, and selectively supplied to one or more bleed air supply ducts.

The fan air duct and the bleed air supply ducts may together form part of an overall Bleed Air System (BAS); each duct of which is subjected to high pressure air flows, and has a respective valve. Valves used in a BAS are generally configured as pressure regulating valves, having an actuator coupled thereto that controls the valve in order to regulate air pressure in the downstream region of a respective duct. In some embodiments, BAS valves may be configured as pressure regulating valves, whereas in other embodiments, BAS valves are configured as shut-off valves that simply move between an open position and a closed position.

In operation, fan air channeling into the fan air duct is generally very cold, subjecting the fan air valve to cold upstream air. In some scenarios, the cold fan air causes ice to build up on a perimeter of the valve plate when the fan air valve is in a closed position. As the fan air valve is modulated open, torque reducing features of the fan air valve may interact with accumulated perimeter ice, compressing the ice. It is postulated that, in some scenarios, the compression of ice by the fan air valve could cause the fan air valve to be stuck in a closed position.

Although embodiments may be described herein as being implemented in a turbofan gas turbine engine application, it will be appreciated that the present disclosure may be implemented with other types of gas turbine engines as well as applications that do not utilize gas turbine engines. The embodiments described refer to, but are not limited to, pneumatic actuated fan air valves. The disclosure can be applied to applications using actuated valves that are subjected to ice. Non limiting examples of such applications include military aircraft, large commercial transport aircraft, regional transport aircraft, business jets, and helicopters.

Figure 3:
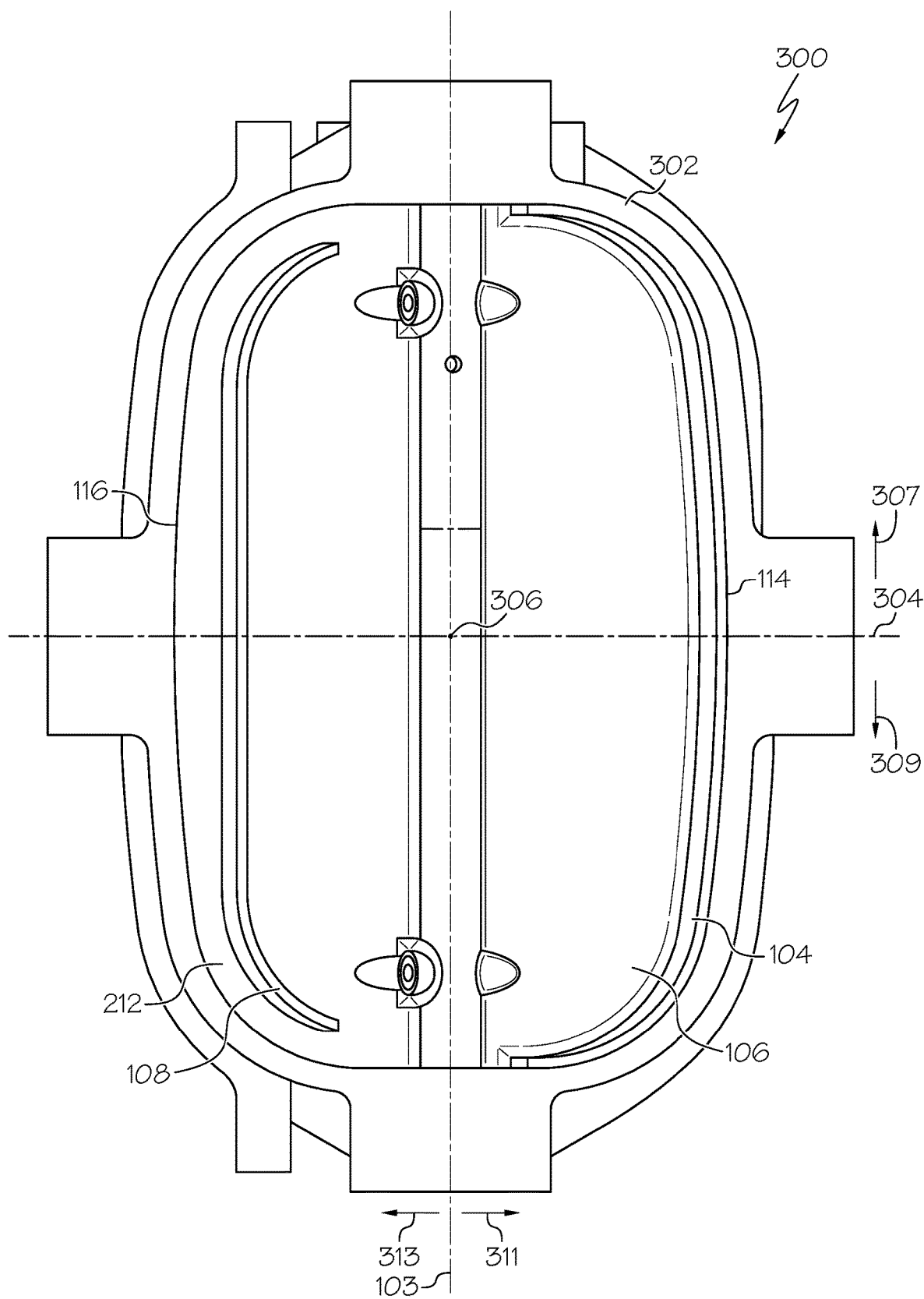
FIG. 3 is a perspective view of the fan air valve of FIG. 1 pivotally mounted within an inner surface of a flow path of a duct, viewed from the upstream side, in accordance with various embodiments.
Figure 4:
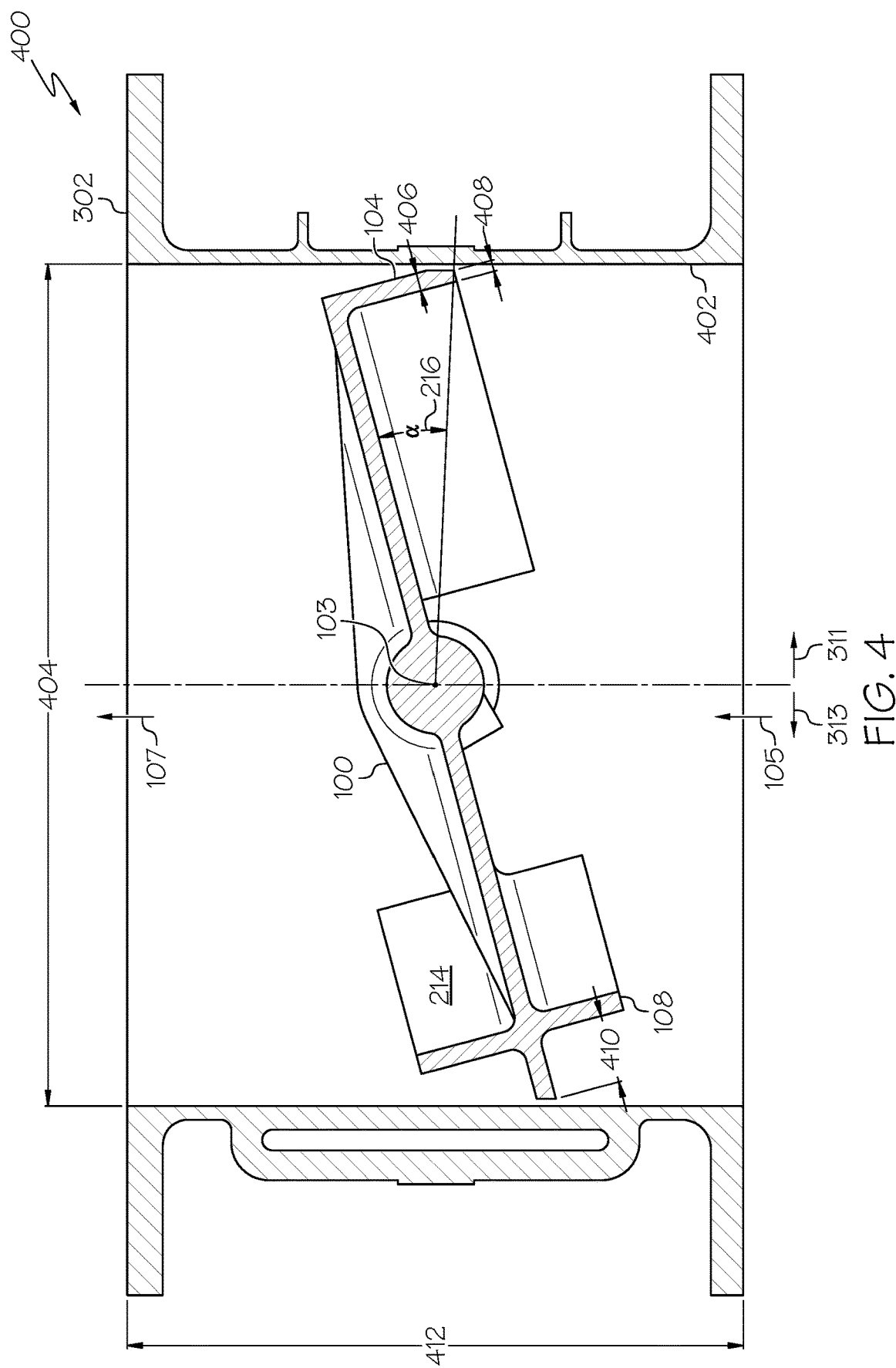
FIG. 4 is a top down perspective view showing a partial cross section of the fan air valve of FIG. 1 pivotally mounted within an inner surface of a flow path of a duct, in a closed position, in accordance with the embodiment.
Figure 6:
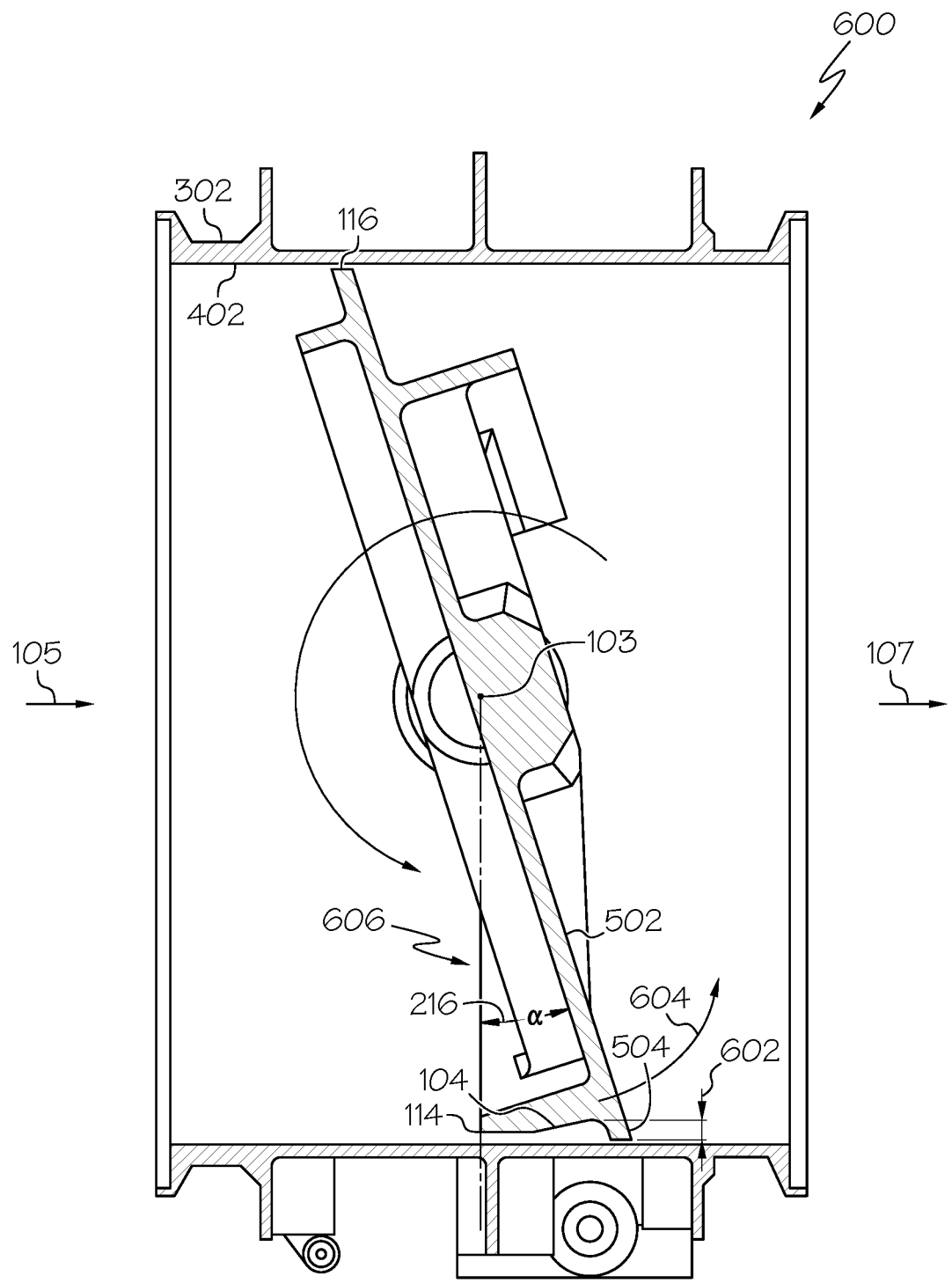
FIG. 6 is a top down perspective view as shown in FIG. 5, but with the fan air valve in a closed position within the inner surface of the flow path of a duct.

Turning now to FIG. 1, a perspective view depicts a fan air valve 100 in accordance with various embodiments. The fan air valve 100 comprises a substantially planar plate 102 having a length 110 and width 112. The substantially planar plate 102 comprises an upstream surface 106 that is also substantially planar. As used herein, "substantially" shall mean plus or minus five percent and "substantially planar plate" may be referred to as "plate" for simplicity. The upstream surface 106 is configured to be positioned within a flow body such that it faces inlet or upstream air 105. The fan air valve 100 may be pivotally mounted within the flow path of a flow body at a top 109 and a bottom 111 and to pivot on a pivot axis 103. The fan air valve 100 may be variously configured to implement its functionality. For example, it may be configured as a butterfly plate, a globe valve element, or a gate valve element, just to name a few. No matter its specific configuration, the fan air valve 100 is configured to move into one or more fan air valve positions as required by its application, and under control of a valve actuator (not shown) that may mechanically couple the fan air valve 100 to a flow body or duct. The plate 102 is further configured to have a slightly larger area than a cross sectional area of the flow path that it is to be installed within. As mentioned, the flow body may be a duct (FIG. 3, 302). FIGS. 4 and 6 and the accompanying description illustrate the plate 102 having a slightly larger area than a cross sectional area of the associated flow path 402.

In order to address torque, the upstream surface 106 may include one or more features, such as standoffs, that extend from the plate 102 toward or into the upstream airflow 105. Each standoff may be described by application specific characteristics, such as, but not limited to, a width (or thickness), a height, a length, and a location, on the planar plate 102. With specific focus on the standoff 104, the height of the standoff 104 is a function of the aerodynamic torque on the fan air valve 100. As with other standoffs, the standoff 104 is configured to reduce the torque by extending toward high pressure incoming upstream air 105, thereby reducing its impact on the plate 102.

In the embodiment of FIG. 1, the standoff 104 is located on the perimeter of the plate 102 (proximate the first edge 114), and the length of the standoff 104 is substantially the full length 110 of the plate 102 of the fan air valve 100, plus added curvature toward the pivot axis 103 at the top 109 and bottom 111. Another standoff 108 may be located along the perimeter of the plate 102 (proximate a second edge 116). As is described in more detail in connection with FIG. 3, the first edge 114 and second edge 116 occupy opposite sides of the pivot axis 103 of the plate 102.

In an embodiment, the flow path of the flow body or duct (FIG. 3 302) is defined by a length and a diameter (FIG. 4 length 412 and diameter 404), and within the flow path of the duct 302 the upstream air 105 on an inlet side of the valve 100 becomes downstream air 107 on an exit side of the valve 100. The flow path of the duct 302 may be constructed of any one of numerous suitable materials and is manufactured or tooled to comprise a substantially smooth inner surface within which the valve 100 may be pivotally mounted. While the flow path preferably has an oval or circular cross section, the flow path may have any one of numerous suitable cross sectional shapes. The plate 102 is rotatable about the pivot axis 103, which is perpendicular to a flow path centerline, and configured for pivoting between a closed position, in which the plate 102 substantially prevents or inhibits airflow through the flow path, and an open position, in which the plate 102 creates an aperture permitting air to flow from an inlet side to an exit side in the flow path.

Figure 2:
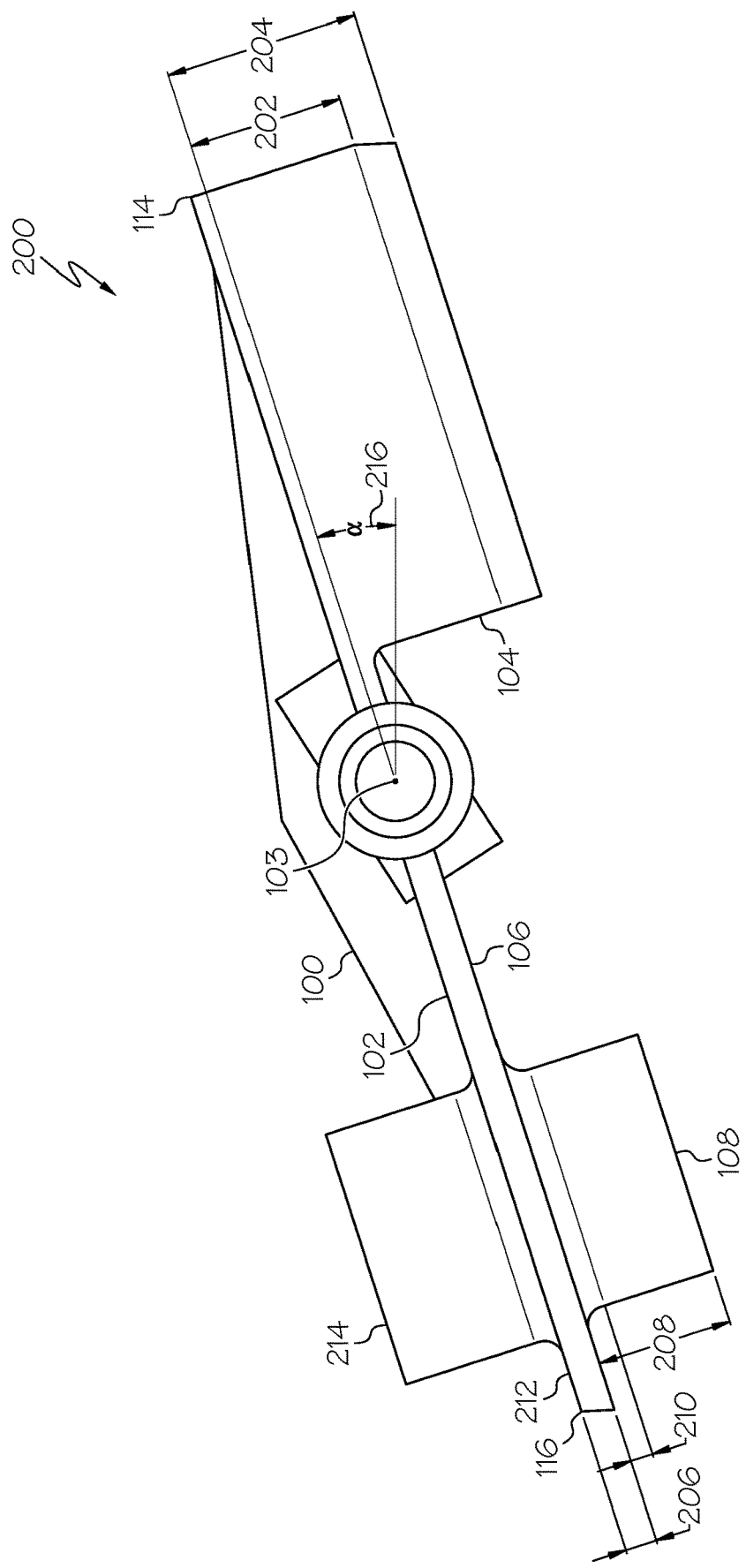
FIG. 2 is a top down perspective view of the fan air valve of FIG. 1.

Turning to FIG. 2, and with continued reference to FIG. 1, the standoff 104 is shown having a first height 202 and a second height 204. Between the first height 202 and second height 204, the thickness of the standoff 104 may taper (thicknesses are depicted in FIG. 4). The plate 102 may be described as having a width 206. One or more of the standoffs (104, 108) may have a thickened base area 210 at a location where it joins with the plate 102. In an embodiment, another standoff 214 extends from a downstream surface of the plate 102 toward or into downstream air 107. In various embodiments, one or more of the employed standoffs (104, 108, and 214) may be located a small distance from the edge of the plate 102, creating a lip 212. Regardless of the presence of the lip 212, the upstream surface 106 of the plate 102 is offset from being perpendicular to the flow path centerline by the angle 216 when the valve 100 is in a closed position; the angle 216 being based on the height 204 of the standoff 104. Note that the standoff height 204 is a value that results in the top most edge of the standoff (i.e., the edge not attached to the plate 102) being coincident with a perpendicular plane through the duct 302 at a point farthest from the axis of rotation; this enables the standoff 104 to move away from an inner surface of the duct as the plate rotates open (see FIG. 4 and FIG. 6 for depictions of the plate 102 in a closed position within the flow path).

With reference to FIG. 3, the fan air valve 100 is shown mechanically coupled to a duct 302, creating a "fan air duct assembly." An axis 304 is perpendicular to the pivot axis 103, crossing through center point 306. Accordingly, the area of the fan air valve 100 may be defined as having a first quadrant defined by the cross sectional area (311, 307), a second quadrant defined by the cross sectional area (311, 309), a third quadrant defined by the cross sectional area (313, 309), and a fourth quadrant defined by the cross sectional area (313, 307). There is symmetry between the first and second quadrants, and between the third and fourth quadrants. The pivot axis 103 bisects a first half, defined as the first and second quadrants, from a second half, defined as the third and fourth quadrants. In the embodiment depicted in FIG. 3, while standoff 104 and standoff 108 each extend substantially the length 110 of the plate 102 in their respective halves, a lip 212 extends from second edge 116 to the standoff 108. It is also contemplated that standoff 108 may be removed without altering the functionality described in the present disclosure.

With reference to FIG. 4, and as used herein, "the perimeter of the fan air valve" means the edges (114, 116) of halves of the fan air valve 100 that fit within the inner surface 402 to inhibit airflow through the flow path when the fan air valve 100 is closed. As mentioned, it has been postulated that ice could accumulate around the perimeter of the fan air valve 100 while it is in the closed position. As may be appreciated, the edge 114 (on the first half) that pulls away from the upstream air 105 as the fan air valve 100 pivots or modulates open is the edge most likely to compress ice if ice has accumulated; this edge may be referred to as a "downstream edge" of the fan air valve 100. With reference back to FIG. 3, edge 114, comprising the first and second quadrants, pulls away from upstream airflow 105 when the fan air valve 100 modulates open; concurrent with that, edge 116 moves into the upstream airflow 105.

In FIG. 4, the edge 116 and the standoff 108 are separated by a distance 410, which may be referred to as a lip. FIG. 4 also depicts a tapering thickness of the first standoff 104. At the point where standoff 104 joins plate 102, the standoff has thickness 406, which extends to height 202. From height 202 to height 204, the standoff thickness tapers from standoff thickness 406 to standoff thickness 408. Regardless of the tapering embodied by standoff 104, the height 204 of the standoff 104 informs the size of the angle 216, which is the offset of the upstream surface of the plate 102 measured from a line perpendicular (FIG. 6, 606) to the flow path centerline by angle 216. In an embodiment, the angle 216 is less than thirty degrees and more than one degree. In another embodiment, the angle 216 is preferably between fifteen and eighteen degrees. As used herein, a closed flow area of a valve is an area of the upstream facing surface of the valve when it is in a closed position in a respective duct. Accordingly, with an angle 216 described herein, the closed flow area of the fan air valve 100 is not much larger than the closed flow area of a valve having a perpendicular plate. The angle 216 and associated offset of the upstream surface of the plate 102 averts compression of perimeter ice by the standoff 104 on the downstream edge 114 because the angle 216 assures that the standoff 104 is pulling upward and backward 604 (toward the downstream air 107) when the fan air valve 100 modulates open.

Figure 5:
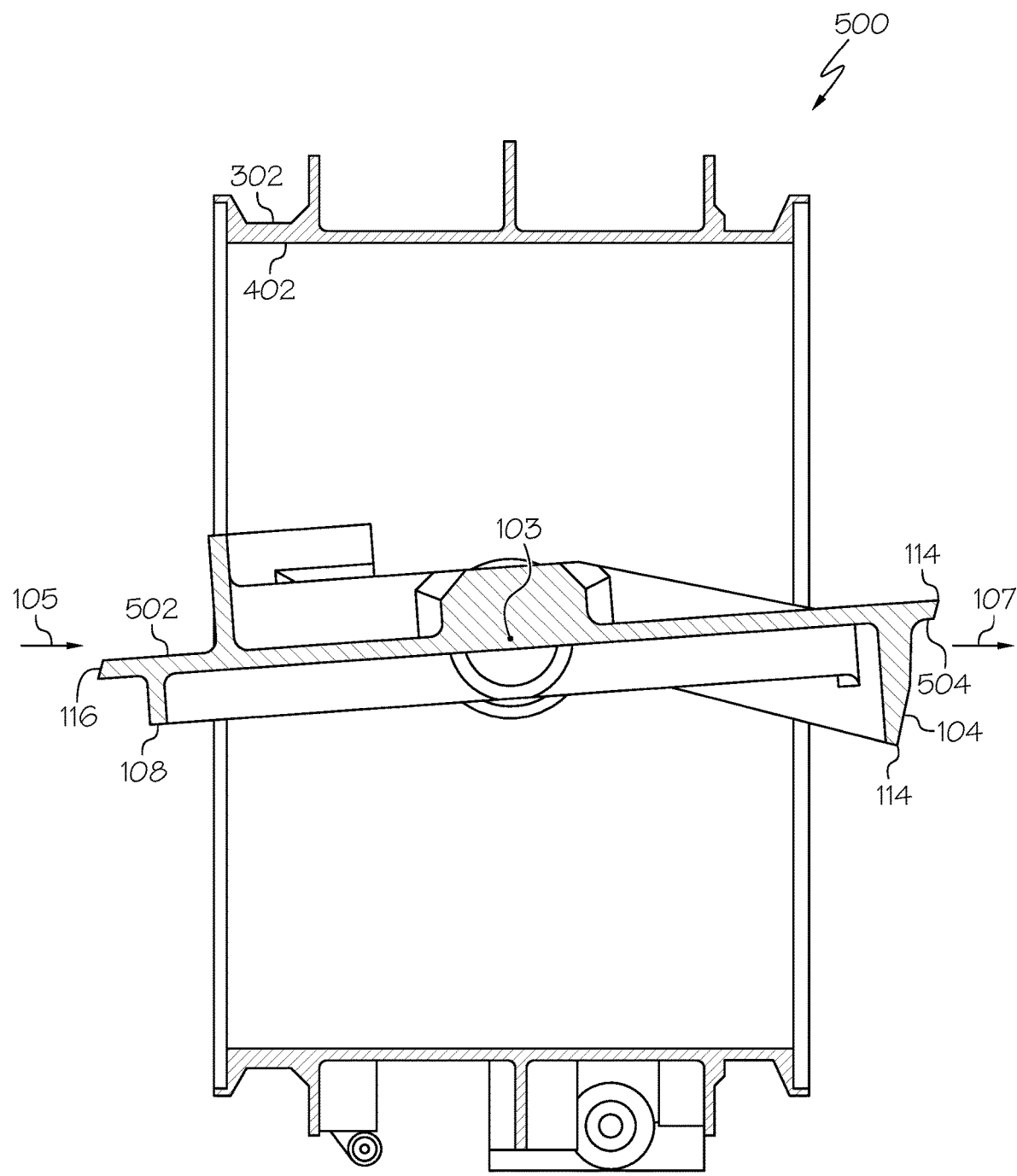
FIG. 5 is a top down perspective view showing a partial cross section of another fan air valve pivotally mounted within an inner surface of a flow path of a duct, in an open position, in accordance with another embodiment.

In FIGS. 5 and 6, a fan air valve 502 is shown in an open position (FIG. 5) and in a closed position (FIG. 6). As can be seen in these figures, the embodiment comprises a standoff 104 placed at a distance 602 from the edge 114, creating a lip 504. The presence or absence of the lip 504 does not affect the angle 216, from which the upstream surface of the plate 102 is offset from the perpendicular 606 to the flow path centerline. The standoff 104 height 204 is also not affected by the presence or absence of the lip 504, and the angle 216 is still based on the standoff height 204, as in FIG. 2.

The provided disclosure describes embodiments of a fan air valve for use in high airflow applications. In particular, the described embodiments of fan air valves provide the technical effect of not compressing ice that may have accumulated around the perimeter as they modulate open. The provided fan air valves employ a plate 102 with a standoff 104 of a height based on aerodynamic torque of the system. The height of the standoff 104 informs the size of the angle 216. The angle 216 is an angle at which a valve plate 102 is positioned within the flow path. The angle is less than thirty degrees; therefore the closed flow area of the fan air valve 100 is not much larger than the closed flow area of a valve having a perpendicular plate. The provided embodiments, by design, and without dependence upon additional software system controls, avert compression of perimeter ice on the downstream edge 114 during modulation While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing exemplary embodiments. It being understood that various changes may be made in the function and arrangement of elements described in an exemplary embodiment without departing from the scope of the disclosure as set forth in the appended claims.

What is claimed is:

1. A fan air valve for use in a flow path of a duct having an inner surface and a flow path centerline, the fan air valve comprising:
   a plate configured to be pivotally mounted within the inner surface of the duct, the plate rotatable about a pivot axis that perpendicularly bisects the flow path centerline, the plate being planar in its extent within the inner surface of the duct, from a first edge at the inner surface of the duct to a second edge on an opposite side of the pivot axis from the first edge at the inner surface of the duct, the plate configured for pivoting between a closed position, in which the plate substantially inhibits airflow through the duct, and an open position, in which the plate creates an aperture in the duct; and
   a standoff located near the first edge on an upstream surface of the plate, the first edge being a downstream edge, the standoff extending perpendicularly outward from the downstream edge of the upstream surface of the plate; and
   wherein, in the closed position, the plate is rotated such that the upstream surface of the plate is offset from the flow path centerline by ninety degrees minus an angle, the angle being based on a height of the standoff, the closed position placing the first edge downstream and the second edge upstream.

2. The fan air valve of claim 1, wherein the height of the standoff is a function of aerodynamic torque through the flow path, and the angle is less than thirty degrees.

3. The fan air valve of claim 2, wherein the angle is between fifteen and eighteen degrees.

4. The fan air valve of claim 3, wherein the standoff extends along a perimeter of the plate, and the first edge of the plate rotates away from the upstream air as the fan air valve pivots open.

5. The fan air valve of claim 4, wherein the standoff is a first standoff, and further comprising a second standoff located on the upstream surface of the plate, extending along the second edge of the plate.

6. The fan air valve of claim 5, further comprising a third standoff located on a downstream surface of the plate.

7. The fan air valve of claim 6, wherein the first standoff is located a small distance from the first edge of the plate, creating a lip.

8. A fan air duct assembly for a turbofan engine bleed air system, the fan air duct assembly comprising:
   a duct comprising an inner surface surrounding a flow path with a centerline, the duct configured to mount within an aircraft bleed air system;
   a fan air valve, including:
   a plate pivotally mounted within an inner surface of the duct, the plate
      rotatable about a pivot axis that perpendicularly bisects the centerline of the flow path, the plate being planar in its extent within the inner surface of the duct, from a first edge at the inner surface of the duct to a second edge on an opposite side of the pivot axis from the first edge at the inner surface of the duct, the plate configured for pivoting between a closed position, in which the plate substantially inhibits airflow through the flow path, and the plate is rotated such that an upstream surface of the plate is offset from the flow path centerline by ninety degrees minus an angle and places the first edge downstream and the second edge upstream, and an open position, permitting airflow in the flow path; and
   a standoff located near the first edge on the upstream surface of the plate and extending perpendicularly outward from the upstream surface of the plate, and wherein the angle is based on the a height of the standoff.

9. The fan air duct assembly of claim 8, wherein the angle is less than thirty degrees.

10. The fan air duct assembly of claim 9, wherein the standoff extends along a half of the plate that pulls away from the upstream air as the fan air valve pivots open and the angle is between fifteen and eighteen degrees.

11. The fan air valve of claim 9, wherein the height of the standoff is a function of aerodynamic torque through the flow path.

12. The fan air valve of claim 11, wherein the standoff is a first standoff, and further comprising a second standoff located on the upstream surface of the plate, on the second edge of the plate from the first standoff.

13. The fan air valve of claim 12, further comprising a third standoff located on a downstream surface of the plate.

14. The fan air valve of claim 12, wherein the first standoff is located a small distance from the first edge of the plate, creating a lip.

15. A turbofan engine, comprising:
   a flow body comprising an inner surface surrounding a flow path with a centerline therethrough;
   a fan air valve including:
   a plate pivotally mounted within the inner surface, the plate:
      rotatable about a pivot axis that perpendicularly bisects the centerline of the flow path, the plate being planar in its extent within the inner surface of the flow body, from a first edge at the inner surface of the flow body to a second edge on an opposite side of the pivot axis from the first edge at the inner surface of the flow body, the plate
   configured for pivoting between a closed position, in which the plate substantially inhibits airflow through the flow path, and the plate is rotated such that an upstream surface of the plate is offset from the flow path centerline by ninety degrees minus an angle, placing the first edge downstream and the second edge upstream, and an open position, permitting airflow in the flow path; and
   a standoff located near the first edge on the upstream surface of the plate and extending perpendicularly outward from the upstream surface of the plate, and wherein the angle is based on a height of the standoff.

16. The turbofan engine of claim 15, wherein the angle is between fifteen and eighteen degrees.

17. The turbofan engine of claim 16, wherein the height of the standoff is a function of aerodynamic torque through the flow path.

18. The turbofan engine of claim 17, wherein the plate is divided into two halves by the pivot axis, and the standoff extends along a perimeter of a half of the plate that pulls away from the upstream air as the plate rotates to the open position.

19. The turbofan engine of claim 18, wherein the flow body is a fan air duct.

20. The turbofan engine of claim 19, wherein the standoff is a first standoff, and further comprising a second standoff located on the upstream surface of the plate, on the second edge of the plate.

\* \* \* \* \*